United States Patent
Dubose

(10) Patent No.: US 7,296,526 B1
(45) Date of Patent: Nov. 20, 2007

(54) DUAL STABILITY SEAL SKIRT SYSTEM FOR AIR CUSHION VEHICLE

(75) Inventor: W. Keith Dubose, Pensacola, FL (US)

(73) Assignee: Textron Inc., Wilmington, MA (US)

( * ) Notice: Subject to any disclaimer, the term of this patent is extended or adjusted under 35 U.S.C. 154(b) by 0 days.

(21) Appl. No.: 11/469,440

(22) Filed: Aug. 31, 2006

(51) Int. Cl.
*B63B 1/38* (2006.01)

(52) U.S. Cl. .................................. 114/67 A; 180/127
(58) Field of Classification Search ............. 114/67 A; 180/116, 117, 118, 121, 127, 128
See application file for complete search history.

(56) References Cited

U.S. PATENT DOCUMENTS

| | | | |
|---|---|---|---|
| 3,294,188 A | | 12/1966 | Hardy |
| 3,362,499 A | * | 1/1968 | Tripp ........................ 180/121 |
| 3,399,644 A | * | 9/1968 | Hunt ........................ 114/67 A |
| 3,412,956 A | | 11/1968 | Cockerell |
| 3,478,836 A | * | 11/1969 | Eckered et al. ............. 180/128 |
| 3,513,933 A | | 5/1970 | Faure |
| 3,783,965 A | * | 1/1974 | Wright ...................... 180/128 |
| 3,850,126 A | | 11/1974 | Leonard |
| 3,888,330 A | * | 6/1975 | Eggington et al. .......... 180/121 |
| 4,096,921 A | | 6/1978 | Guienne |
| 4,169,514 A | | 10/1979 | Wheeler et al. |
| 4,660,670 A | | 4/1987 | Mattox |
| 4,834,011 A | * | 5/1989 | Bell .......................... 114/67 A |
| 5,560,443 A | * | 10/1996 | DuBose ...................... 180/121 |
| 2007/0056788 A1 | * | 3/2007 | Dubose et al. .............. 180/121 |

* cited by examiner

*Primary Examiner*—Lars A. Olson
(74) *Attorney, Agent, or Firm*—Garvey, Smith, Nehrbass & North, L.L.C.; Charles C. Garvey, Jr.; Seth M. Nehrbass

(57) ABSTRACT

A marine air cushion vehicle provides a hull having a hull periphery, an inflatable bag connected to the hull at the hull periphery, an inflatable skirt connected to the bag, and a pair of inflatable lateral stability seals, each extending generally perpendicular to the hull central longitudinal axis and to port and starboard positions. A plurality of inflatable open cones are attached to the inflatable bag, the open cones being positioned in between the lateral stability seals in a fore to aft direction. The skirt includes in part the inflatable open cones. In another embodiment, the open cones can be alternatively placed in between the lateral stability seals or in front of the lateral stability seals, in between a lateral stability seal and the hull bow. In another alternative embodiment, inflatable open cones can be positioned in between a lateral stability seal and the hull stern. In another embodiment, the inflatable skirt includes some inflatable open cones, and wherein the air cushion is not subdivided by any longitudinally positioned seals.

50 Claims, 5 Drawing Sheets

DUAL STABILITY SEAL SKIRT SYSTEM FOR AIR CUSHION VEHICLE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to air cushion vehicles such as hovercraft. More particularly, the present invention relates to an improved hovercraft hull arrangement that provides a segmented air cushion featuring a peripheral air bag to which are attached downwardly extending inflatable fingers, some of which are positioned on transverse lateral stability seals and others of which are positioned on the peripheral bag.

2. General Background of the Invention

Air cushion vehicles such as hovercrafts typically provide a hull that can be a rigid hull to which is affixed a peripheral air bag. Air is generated by powerful fans that elevate the pressure under the rigid hull and inside of the peripheral bag. In some versions of a hovercraft or air cushion vehicle, inflatable fingers extend downwardly from the peripheral skirt. Such fingers are also inflated.

The following table gives examples of patents that relate to air cushion vehicles, some of which have subdivisions of the air cushion with inflatable portions that extend transversely and longitudinally.

TABLE

| PATENT NO. | TITLE | ISSUE DATE |
| --- | --- | --- |
| 3,294,188 | Shock Absorbing Means for Air Cushion Vehicles | Dec. 27, 1966 |
| 3,362,499 | Vehicles for Traveling Over a Surface | Jan. 09, 1968 |
| 3,412,956 | Vehicle for Traveling Over Land and/or Water | Nov. 26, 1968 |
| 3,513,933 | Multiskirt Ground Effect Machine | May 26, 1970 |
| 3,850,126 | Fluid Cushion Supported Vehicles | Nov. 26, 1974 |
| 4,096,921 | Vehicle Supported by an Air Cushion | Jun. 27, 1978 |
| 4,169,514 | Air Cushion Vehicles | Oct. 02, 1979 |
| 4,660,670 | Wing-in-Ground Effect Air Cushion Vehicle | Apr. 28, 1987 |

If a hovercraft or air cushion vehicle is to operate in heavy seas, it must provide stability against pitch and roll that are generated by such heavy wave action. If a hovercraft is operated in seas that are too heavy, portions of the inflatable skirt can be deflated causing the craft to roll or pitch excessively.

BRIEF SUMMARY OF THE INVENTION

The present invention provides an improved marine air cushion vessel. The apparatus of the present invention provides a hull having a hull periphery, port and starboard sides, a bow, a stern, and a central longitudinal axis. The hull is preferably a rigid hull. An inflatable bag is connected to the hull at the hull periphery. The inflatable bag preferably extends around the entire hull periphery. A plurality of inflatable fingers are attached to the underside of the inflatable bag.

A pair of lateral stability seals are positioned perpendicular to the hull central longitudinal axis. These lateral stability seals extend almost the full width of the hull, to port and starboard positions and next to the inflatable bag.

The inflatable skirt is defined by a plurality of inflatable fingers attached to the inflatable bag. A portion of the plurality of fingers attached to the inflatable bag are inflatable open cone fingers, the open cone fingers being positioned in between the lateral stability seals in a fore to aft direction.

A plurality of inflatable open cone fingers can be positioned in between the bow and a forward one of the lateral stability seals.

A plurality of inflatable open cone fingers can be positioned in between the stern and an aft one of the lateral stability seals.

As an alternative to the plurality of open cone fingers, a plurality of inflatable open fingers can be positioned back to back, the inboard finger inside the outboard finger.

A plurality of inflatable back to back open fingers can be positioned continuously in between the lateral stability seals.

Inflatable back to back open fingers can be positioned continuously in between the lateral stability seals and on both port and starboard sides of the inflatable bag.

The present invention in one embodiment provides a marine air cushion vessel that has a hull having a hull periphery, port and starboard sides, a bow, a stern, and a central longitudinal axis. An inflatable bag is connected to the hull at the hull periphery.

An inflatable skirt is connected to the bag.

A pair of inflatable lateral stability seals are provided, each extending generally perpendicular to the hull central longitudinal axis and to port and starboard positions of the hull wherein each abuts the peripheral bag.

A plurality of inflatable cones are attached to the inflatable bag, some of the open cones positioned in between the lateral stability seals and some of the cones positioned in between a lateral stability seal and the hull bow.

The skirt includes in part the inflatable open cones.

In another embodiment, a marine air cushion vehicle provides a hull having a hull periphery, port and starboard sides, a bow, a stern, and a central longitudinal axis, the hull having a length, a beam, and a length to beam ratio of greater than 2.0.

An inflatable bag is connected to the hull at the hull periphery.

An inflatable skirt is connected to the bag.

A pair of inflatable lateral stability seals are provided, each extending generally perpendicular to the hull central longitudinal axis and to port and starboard sides of the hull.

A plurality of inflatable open cones is attached to the inflatable bag, some of the open cones positioned in between the lateral stability seals.

The skirt includes in part the inflatable open cones.

In another embodiment of the apparatus of the present invention, a marine air cushion vessel is provided that has a hull having a hull periphery, port and starboard sides, a bow, a stern, and a central longitudinal axis. An inflatable bag is connected to the hull at its periphery.

An inflatable skirt is connected to the bag.

A pair of inflatable lateral stability seals are provided, each extending generally perpendicular to the hull central longitudinal axis and between the port and starboard sides of the hull. The lateral stability seals are spaced apart from each other about equal distances.

A plurality of inflatable open cones are attached to the port and starboard sides of the inflatable bag.

The skirt includes in part the inflatable open cones.

In another embodiment of the apparatus of the present invention, a marine air cushion vessel is provided that has a hull having a hull periphery, port and starboard sides, a bow, a stern, and a central longitudinal axis. An inflatable bag is connected to the hull at its periphery, the bag extending below the rigid hull.

A pair of inflatable lateral stability seals are provided, each extending generally perpendicular to the hull central longitudinal axis and to port and starboard sides of the hull.

An inflatable skirt is connected to the bag, the skirt providing an air cushion under the rigid hull when inflated.

The inflatable skirt includes in part a plurality of inflatable open cones, the air cushion being subdivided by the lateral stability seals into three air cushion sections.

The air cushion is not subdivided by any longitudinally positioned seals.

At least one of the air cushion sections includes some inflatable open cones.

Preferably, for better stability, at least half of the open fingers are open cone fingers. For example, in an ACV with 35 fingers along each side, with some open fingers and some open cone fingers, typically at least 18 are open cone fingers.

Preferably, there are open fingers, some of which are open cones, along each side of the hull, and at least half of the open fingers positioned along each side of the hull are open cones.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
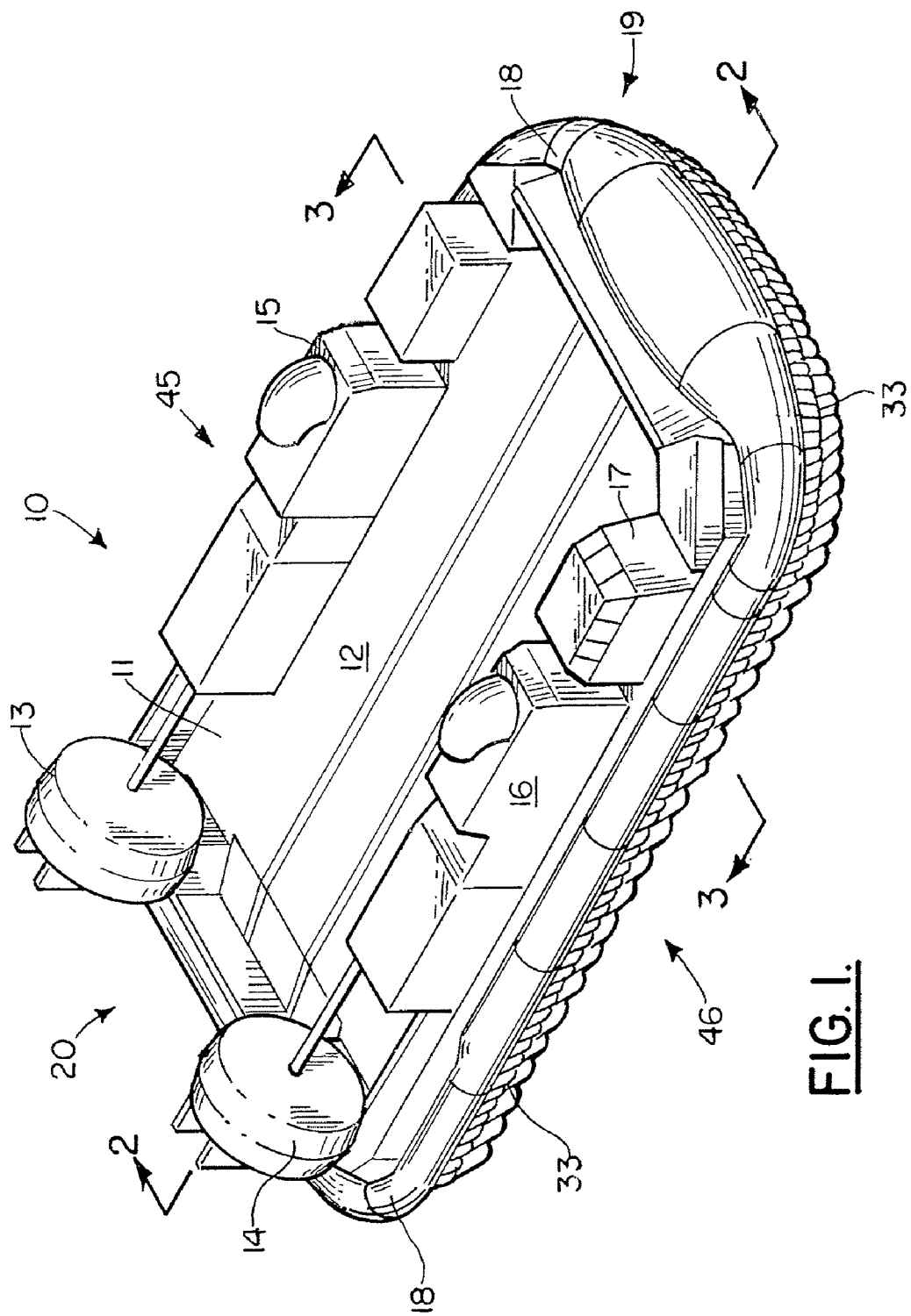
FIG. 1 is a perspective view of the preferred embodiment of the apparatus of the present invention.

FIGS. 1-4 show the preferred embodiment of the apparatus of the present invention designated generally by the numeral 10. Marine air cushion vehicle (or ACV) 10 has a port side 45 and a starboard side 46. ACV 10 further provides a hull 11 that can be a rigid hull of welded metal for example. Hull 11 provides cargo deck 12 that can receive vehicles to be transported such as tanks, trucks or the like.

A propulsion system is provided such as for example the port propulsion unit 13 and the starboard propulsion unit 14.

A pair of (port and starboard) air lift fans 15, 16 enable air to be pumped under pressure below hull 11 and within the confines of inflatable bag 18 and skirt 33. Hull 11 can also provide a pilot house 17, cabin or the like. When ACV 10 is at rest, hull 11 rests upon port rails 27 and starboard rails 28.

Figure 2:
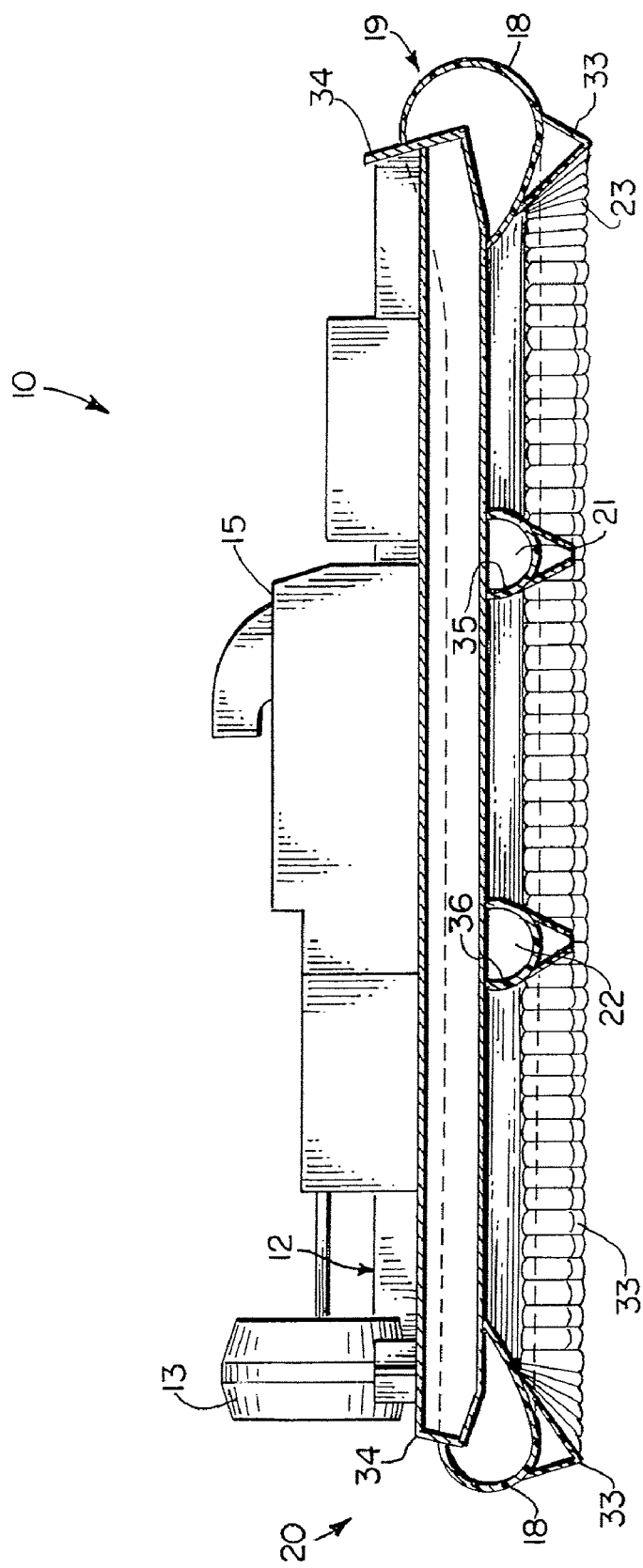
FIG. 2 is a sectional view taken along lines 2-2 of FIG. 1.
Figure 3:
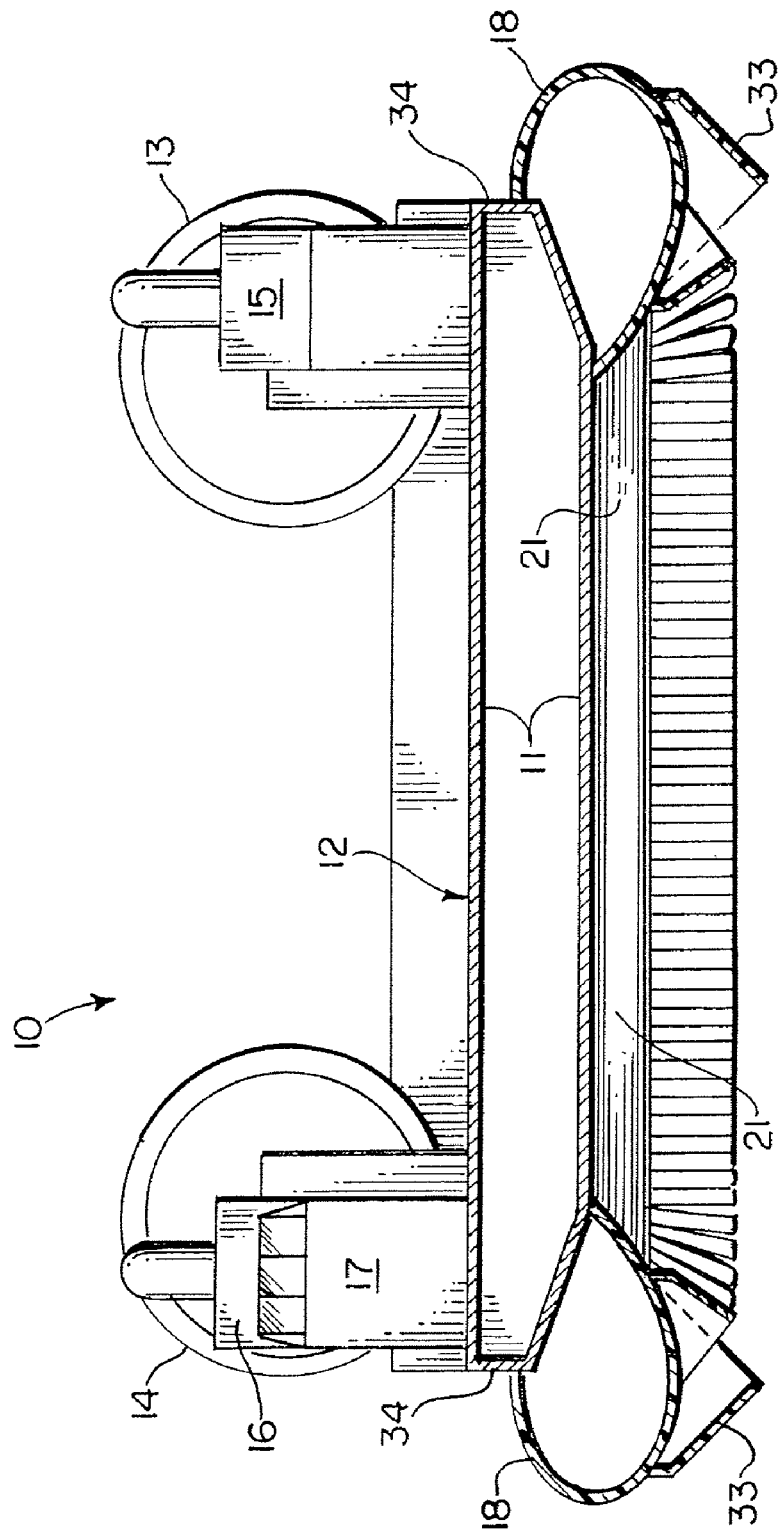
FIG. 3 is a sectional view taken along lines 3-3 of FIG. 1.
Figure 4:
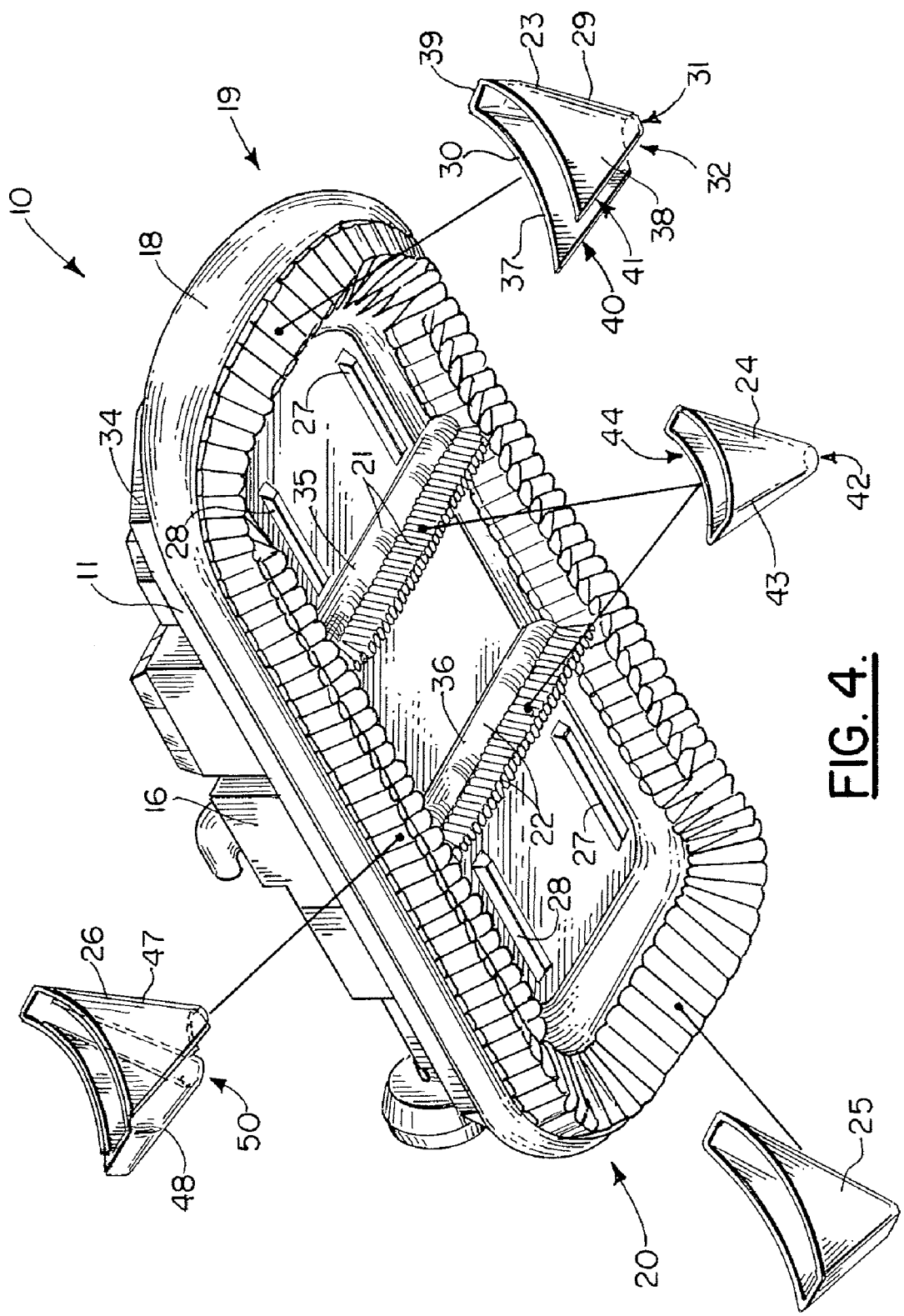
FIG. 4 is a perspective view of the preferred embodiment of the apparatus of the present invention showing the underside of the hull.

Hull 11 provides a hull periphery 34. Inflatable bag 18 is attached to hull 11 at hull periphery 34 as shown in FIGS. 2-4. Hull 11 provides bow 19 and stern 20. In between bow 19 and stern 20 are lateral stability seals 21, 22, as shown in FIGS. 2, 3 and 4. Each lateral stability seal 21, 22 can be comprised of an inflatable bag 35, 36 to which are attached a plurality of inflatable wrapped cones or wrapped cone fingers 24 as shown and described in copending U.S. patent application Ser. No. 10/832,198, filed 26 Apr. 2004, published as US2005/0236200A1 on 27 Oct. 2005, incorporated herein by reference, copending International Patent Application no. PCT/US2005/12127, filed 11 Apr. 2005, published as WO 2005/08180 on 17 Nov. 2005, incorporated herein by reference (see FIGS. 4-5), and copending U.S. patent application Ser. No. 11/469,412, filed 31 Aug. 2006, incorporated herein by reference. This is not a continuation or continuation-in-part of any of these patent applications.

Figure 6:
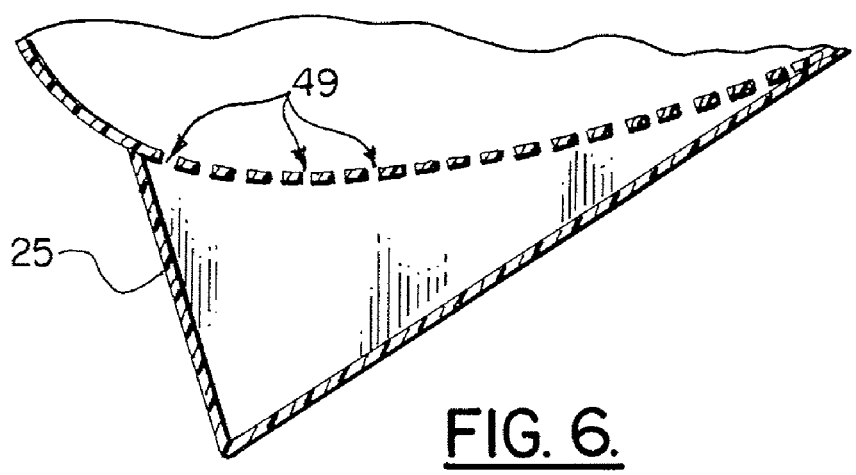
FIG. 6 is a fragmentary sectional view of the preferred embodiment of the apparatus of the present invention.

The bow 19 portion of vessel 10 provides inflatable bag 18 to which are attached inflatable open fingers 23 (see FIGS. 2 and 4). The stern 20 portion of hull 11 provides inflatable fingers 25 connected thereto at inflatable bag 18 (see FIGS. 4 and 6). Back to back fingers 26 can be placed along the port and starboard sides of hull 11, connected thereto at inflatable bag 18 as shown (see FIGS. 4 and 7).

In FIG. 4, the inflatable open finger 23 has a finger outer panel 29 with side panel 30 and finger lower end 31. The panel 29 is defined by a pair of finger side panels 37, 38 connected to a finger apron attachment panel 39. The panel 39 can be inclined. Each of the finger side panels 37, 38 provides a finger inner edge 40, 41 respectively. The edges 40, 41 can be inclined as shown in FIG. 4. A space 32 is provided behind finger apron attachment panel 39 and in between panels 37, 38.

Figure 5:
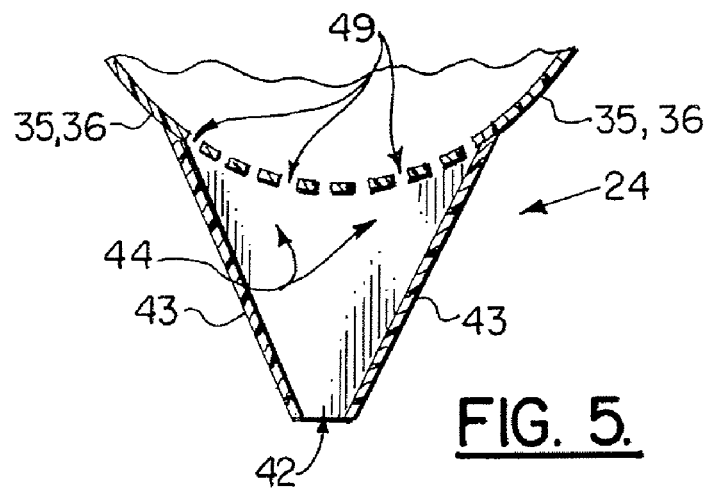
FIG. 5 is a fragmentary sectional view of the preferred embodiment of the apparatus of the present invention.

The stability seal open cone finger 24 (FIGS. 4-5) that is attached to each of the inflatable bags 35, 36 of lateral stability seals 21, 22 provide a closed wall structure having a stability seal open cone lower opening 42. The opening 42 is provided at the bottom of open cone finger 24 as shown in FIGS. 4 and 5.

Stability seal open cone finger 24 provides a tapered stability seal open cone panel 43 that tapers from a larger upper opening 44 at the top of the cone finger 24 downwardly to the lower smaller diameter opening 42. In the preferred embodiment, the open cone fingers 24 are provided in a side by side configuration to each of the inflatable bags 35, 36 of the lateral stability seals 21, 22 respectively as shown in FIGS. 4 and 5.

Figure 7:
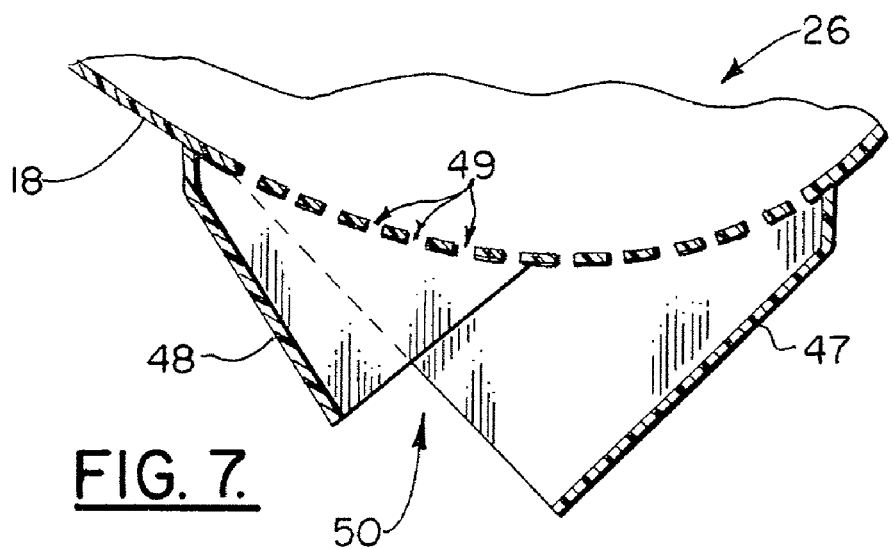
FIG. 7 is a fragmentary sectional view of the preferred embodiment of the apparatus of the present invention.

Back to back fingers 26 attach to inflatable bag 18 to provide overlapping sections 47, 48 (see FIGS. 4 and 7). Each overlapping section 47, 48 has a shape that is similar to the cone finger 23 of FIG. 4. The forward wall section 47 is configured the same as or substantially similar to cone finger 23 in FIG. 4, whereas wall section 48 is similarly configured but faces in the opposite direction. The inflatable cone 26 provides a lower opening 50. Inflation of each of the inflatable cone fingers or inflatable fingers 23, 24, 25, 26 is enabled by finger air feed holes 49 that extend between inflatable bag 18 and the respective cone 23, 25 or 26 and that extend between inflatable bag 35 or 36 and the respective cone.

The following is a list of parts and materials suitable for use in the present invention.

| PARTS LIST | |
|---|---|
| Part Number | Description |
| 10 | marine air cushion vehicle |
| 11 | hull |
| 12 | deck |
| 13 | port propulsion unit |
| 14 | starboard propulsion unit |
| 15 | port air lift fan |
| 16 | starboard air lift fan |
| 17 | pilot house |
| 18 | inflatable bag |
| 19 | bow |
| 20 | stern |
| 21 | forward lateral stability seal |
| 22 | aft lateral stability seal |
| 23 | inflatable open finger |
| 24 | stability seal open cone finger |
| 25 | inflatable stern cone finger |
| 26 | back to back fingers |
| 27 | port aft landing rail |
| 28 | starboard aft landing rail |
| 29 | finger outer panel |
| 30 | finger side panel |
| 31 | finger lower end |
| 32 | space |
| 33 | fingers |
| 34 | hull periphery |
| 35 | forward stability seal inflatable bag |
| 36 | aft stability seal inflatable bag |
| 37 | finger side panel |
| 38 | finger side panel |
| 39 | finger apron attachment panel |
| 40 | finger inner edge |
| 41 | finger inner edge |
| 42 | stability seal open cone lower opening |
| 43 | stability seal open cone panel |
| 44 | stability seal open cone upper opening |
| 45 | port side |
| 46 | starboard side |
| 47 | outer back to back finger |
| 48 | inner back to back finger |
| 49 | bag to finger air feed holes |
| 50 | opening |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A marine air cushion vessel, comprising:
   a) a hull having a hull periphery, port and starboard sides, a bow, a stern, and a central longitudinal axis;
   b) an inflatable bag connected to the hull at the hull periphery;
   c) an inflatable skirt connected to the bag;
   d) a pair of inflatable lateral stability seals, each extending generally perpendicular to the hull central longitudinal axis and to port and starboard positions;
   e) a plurality of inflatable open cones attached to the inflatable bag, the open cones being positioned in between the lateral stability seals in a fore to aft direction; and
   f) wherein the skirt includes in part said inflatable open cones.

2. The marine air cushion vessel of claim 1 wherein the hull is a rigid hull.

3. The marine air cushion vessel of claim 1 further comprising a plurality of inflatable open cones positioned in between the bow and a forward one of the lateral stability seals.

4. The marine air cushion vessel of claim 1 further comprising a plurality of inflatable open cones positioned in between the stern and an aft one of the lateral stability seals.

5. The marine air cushion vessel of claim 1 wherein the inflatable bag extends around the entire hull periphery.

6. The marine air cushion vessel of claim 1 wherein a plurality of the inflatable open cones are positioned back to back.

7. The marine air cushion vessel of claim 6 wherein a plurality of the inflatable open cones are positioned back to back continuously in between the lateral stability seals.

8. The marine air cushion vessel of claim 7 wherein the inflatable open cones are positioned back to back and continuously in between the lateral stability seals on both port and starboard sides of the inflatable bag.

9. The marine air cushion vessel of claim 6 wherein at least half of the inflatable open cones are positioned in between the lateral stability seals.

10. A marine air cushion vessel, comprising:
    a) a hull having a hull periphery, port and starboard sides, a bow, a stern, and a central longitudinal axis;
    b) an inflatable bag connected to the hull at the hull periphery;
    c) an inflatable skirt connected to the bag;
    d) a pair of inflatable lateral stability seals, each extending generally perpendicular to the hull central longitudinal axis and to port and starboard sides of the hull;
    e) a plurality of inflatable open cones attached to the inflatable bag, some of said open cones positioned in between the lateral stability seals and some of said open cones positioned in between a lateral stability seal and the hull bow; and
    f) wherein the skirt includes in part said inflatable open cones.

11. The marine air cushion vessel of claim 10 wherein the hull is a rigid hull.

12. The marine air cushion vessel of claim 10 wherein the inflatable bag extends around the entire hull periphery.

13. The marine air cushion vessel of claim 10 wherein a plurality of the inflatable open cones are positioned back to back.

14. The marine air cushion vessel of claim 10 wherein a plurality of the inflatable open cones are positioned back to back continuously in between the lateral stability seals.

15. The marine air cushion vessel of claim 10 wherein the inflatable open cones are positioned back to back and continuously in between the lateral stability seals on both port and starboard sides of the inflatable bag.

16. The marine air cushion vessel of claim 10 wherein at least half of the inflatable open cones are positioned in between the lateral stability seals.

17. The marine air cushion vehicle of claim 10 wherein each inflatable open cone has a larger portion next to the inflatable bag and a smaller portion spaced below the inflatable bag.

18. The marine air cushion vessel of claim 10 wherein the lateral stability seals divide the underside of the hull into three areas that are of about equal area.

19. The marine air cushion vessel of claim 10 wherein the length to beam ratio of the hull is greater than 2.0.

20. A marine air cushion vessel, comprising:
   a) a hull having a hull periphery, port and starboard sides, a bow, a stern, and a central longitudinal axis, the hull having a length, a beam and a length-to-beam ratio of greater than 2.0;
   b) an inflatable bag connected to the hull at the hull periphery;
   c) an inflatable skirt connected to the bag;
   d) a pair of inflatable lateral stability seals, each extending generally perpendicular to the hull central longitudinal axis and to port and starboard sides of the hull;
   e) a plurality of inflatable open cones attached to the inflatable bag, some of said cones positioned in between the lateral stability seals; and
   f) wherein the skirt includes in part said inflatable open cones.

21. The marine air cushion vessel of claim 20 wherein the hull is a rigid hull.

22. The marine air cushion vessel of claim 20 wherein some of said open cones positioned in between a lateral stability seal and the hull bow.

23. The marine air cushion vessel of claim 20 further comprising a plurality of inflatable open cones positioned in between the bow and a forward one of the lateral stability seals.

24. The marine air cushion vessel of claim 20 further comprising a plurality of inflatable open cones positioned in between the stern and an aft one of the lateral stability seals.

25. The marine air cushion vessel of claim 20 wherein the inflatable bag extends around the entire hull periphery.

26. The marine air cushion vessel of claim 20 wherein a plurality of the inflatable open cones are positioned back to back.

27. The marine air cushion vessel of claim 20 wherein a plurality of the inflatable open cones are positioned back to back continuously in between the lateral stability seals.

28. The marine air cushion vessel of claim 20 wherein the inflatable open cones are positioned back to back and continuously in between the lateral stability seals on both port and starboard sides of the inflatable bag.

29. The marine air cushion vessel of claim 20 wherein at least half of the inflatable cones are positioned in between the lateral stability seals.

30. A marine air cushion vessel, comprising:
   a) a hull having a hull periphery, port and starboard sides, a bow, a stern, and a central longitudinal axis;
   b) an inflatable bag connected to the hull at its periphery;
   c) an inflatable skirt connected to the bag;
   d) a pair of inflatable lateral stability seals, each extending generally perpendicular to the hull central longitudinal axis and between the port and starboard sides of the hull, the lateral stability seals being spaced apart from each other about equal distances;
   e) a plurality of inflatable open cones attached to the port and starboard sides of the inflatable bag; and
   f) wherein the skirt includes in part said inflatable open cones.

31. The marine air cushion vessel of claim 30 wherein the hull is a rigid hull.

32. The marine air cushion vessel of claim 30 wherein the open cones are attached to the inflatable bags at a position in between the lateral stability seals.

33. The marine air cushion vessel of claim 30 wherein one lateral stability seal is spaced a first distance from the bow and the other lateral stability seal is spaced a second distance from the stern, said first and second distances being about equal.

34. The marine air cushion vessel of claim 30 wherein the lateral stability seals are generally parallel.

35. The marine air cushion vessel of claim 30 wherein each of the lateral stability seals is generally perpendicular to the hull longitudinal centerline.

36. The marine air cushion vessel of claim 30 wherein the hull length to hull beam ratio is greater than 2.0.

37. The marine air cushion vessel of claim 30 wherein the hull length to hull beam ratio is between about 2.0 and 4.0.

38. The marine air cushion vessel of claim 30 wherein there are open fingers along each side of the hull, and at least half of the open fingers positioned along each side of the hull are open cones.

39. The marine air cushion vessel of claim 30 wherein at least one of the lateral stability seals has an inflatable open cone.

40. A marine air cushion vessel, comprising:
   a) a hull having a hull periphery, port and starboard sides, a bow, a stern, and a central longitudinal axis;
   b) an inflatable bag connected to the hull at its periphery, said bag extending below the rigid hull;
   c) a pair of inflatable lateral stability seals, each extending generally perpendicular to the hull central longitudinal axis and to port and starboard sides of the hull;
   d) an inflatable skirt connected to the bag that provides an air cushion under the rigid hull when inflated, said inflatable skirt including in part a plurality of inflatable open cones, the air cushion being subdivided by the lateral stability seals into three air cushion sections; and
   e) wherein the air cushion is not subdivided by any longitudinally positioned seals; and
   f) wherein at least one of the air cushion sections includes some inflatable open cones.

41. The marine air cushion vessel of claim 40 wherein the hull is a rigid hull.

42. The marine air cushion vessel of claim 40 wherein the lateral stability seals are generally parallel.

43. The marine air cushion vessel of claim 40 wherein each of the lateral stability seals is generally perpendicular to the hull longitudinal centerline.

44. The marine air cushion vessel of claim 40 wherein the hull length to hull beam ratio is greater than 2.0.

45. The marine air cushion vessel of claim 40 wherein the hull length to hull beam ratio is between about 2.0 and 4.0.

46. The marine air cushion vessel of claim 40 wherein there are open fingers, some of which are open cones, along each side of the hull, and at least half of the open fingers positioned along each side of the hull are open cones.

47. The marine air cushion vessel of claim 40 wherein at least one of the lateral stability seals has an inflatable cone.

48. The marine air cushion vessel of claim 40 comprising a plurality of inflatable open fingers positioned back to back.

49. The marine air cushion vessel of claim 48 wherein a plurality of inflatable open fingers are positioned back to back continuously in between the lateral stability seals.

50. The marine air cushion vessel of claim 40 wherein at least half inflatable open fingers are positioned back to back in between the lateral stability seals.

* * * * *